United States Patent
Ishii et al.

(10) Patent No.: US 7,760,683 B2
(45) Date of Patent: Jul. 20, 2010

(54) CALL ADMISSION CONTROL DEVICE AND CALL ADMISSION CONTROL METHOD

(75) Inventors: Hiroyuki Ishii, Yokosuka (JP); Akihito Hanaki, Yokohama (JP)

(73) Assignee: NTT DoCoMo, Inc., Chiyoda-ku (JP)

( * ) Notice: Subject to any disclaimer, the term of this patent is extended or adjusted under 35 U.S.C. 154(b) by 481 days.

(21) Appl. No.: 11/606,915

(22) Filed: Dec. 1, 2006

(65) Prior Publication Data
US 2007/0135132 A1 Jun. 14, 2007

(30) Foreign Application Priority Data
Dec. 8, 2005 (JP) ............................. 2005-355288

(51) Int. Cl.
*H04L 12/26* (2006.01)
*H04J 1/16* (2006.01)
*H04J 3/06* (2006.01)
(52) U.S. Cl. ...................... 370/328; 370/230; 370/235; 370/252; 370/468; 455/453
(58) Field of Classification Search . 370/395.2–395.43, 370/310–350, 229, 230, 230.1, 231, 234, 370/235, 251–254, 468; 455/450–453, 422.1, 455/460, 524–525, 509; 379/133, 137
See application file for complete search history.

(56) References Cited

U.S. PATENT DOCUMENTS 7,587,203 B2 * 9/2009 Shahidi et al. ............... 370/230

2003/0031129 A1 * 2/2003 Dutkiewicz ................. 370/230
2003/0210660 A1 11/2003 Wiberg et al.

(Continued)

FOREIGN PATENT DOCUMENTS

JP 2002-217956 A 8/2002

(Continued)

OTHER PUBLICATIONS

3GPP, "3rd Generation Partnership Project; Technical Specification Group Radio Access Network; Physical layer aspects of Utra High Speed Downlink Packet Access (Release 4)"; 3GPP TR 25.848; V4.0.0(2001-03); pp. 1-89.

(Continued)

*Primary Examiner*—Lewis G West
*Assistant Examiner*—Jean Chang
(74) *Attorney, Agent, or Firm*—Crowell & Moring LLP

(57) ABSTRACT

Call admission control is performed by considering whether or not a mobile station that has already performed communications and a mobile station that is newly starting communications can attain respective target transmission data rates. A new call admission judgment unit controls admission of a call from a new mobile station based on a packet allocation frequency for satisfying an existing terminal target transmission data rate relating to a plurality of mobile stations and a packet allocation frequency for satisfying a new terminal target transmission data rate relating to a new mobile station. Call admission control can be appropriately performed based on whether or not a target transmission data rate can be satisfied regardless of the cell mode and the way of the occurrence of traffic on a mobile station which has already started communications and a mobile station which is to newly start communications.

9 Claims, 7 Drawing Sheets

U.S. PATENT DOCUMENTS

| | | | |
|---|---|---|---|
| 2004/0008627 A1* | 1/2004 | Garg et al. | 370/235 |
| 2004/0208183 A1* | 10/2004 | Balachandran et al. | 370/395.21 |
| 2006/0171307 A1* | 8/2006 | Gopalakrishnan et al. | 370/229 |
| 2007/0076679 A1* | 4/2007 | Lee | 370/348 |

FOREIGN PATENT DOCUMENTS

| | | | |
|---|---|---|---|
| JP | 2005-525743 A | 8/2005 | |
| WO | WO 03/096571 A1 | 11/2003 | |

OTHER PUBLICATIONS

3GPP2, "cdma2000 High Rate Packet Data Air Interface Specification"; 3$^{rd}$ Generation Partnership Project2; 3GPP2 C.S0024-A Version 1.0, Mar. 2004; http://www/3gpp2.org/Public_html/specs/tsgc.cfm.

* cited by examiner

FIG. 5

WHEN THE NUMBER OF CODES THAT CAN BE ALLOCATED TO THE HS-PDSCH = 15

| CQI VALUE | $R_n$ |
|---|---|
| 1 | 137 |
| 2 | 173 |
| 3 | 233 |
| 4 | 317 |
| 5 | 377 |
| ... | ... |
| 29 | 24222 |
| 30 | 25558 |

⋮

WHEN THE NUMBER OF CODES THAT CAN BE ALLOCATED TO THE HS-PDSCH = 2

| CQI VALUE | $R_n$ |
|---|---|
| 1 | 137 |
| 2 | 173 |
| 3 | 233 |
| 4 | 317 |
| 5 | 377 |
| ... | ... |
| 29 | 2825 |
| 30 | 2825 |

WHEN THE NUMBER OF CODES THAT CAN BE ALLOCATED TO THE HS-PDSCH = 1

| CQI VALUE | $R_n$ |
|---|---|
| 1 | 137 |
| 2 | 173 |
| 3 | 233 |
| 4 | 317 |
| 5 | 377 |
| ... | ... |
| 29 | 1405 |
| 30 | 1405 |

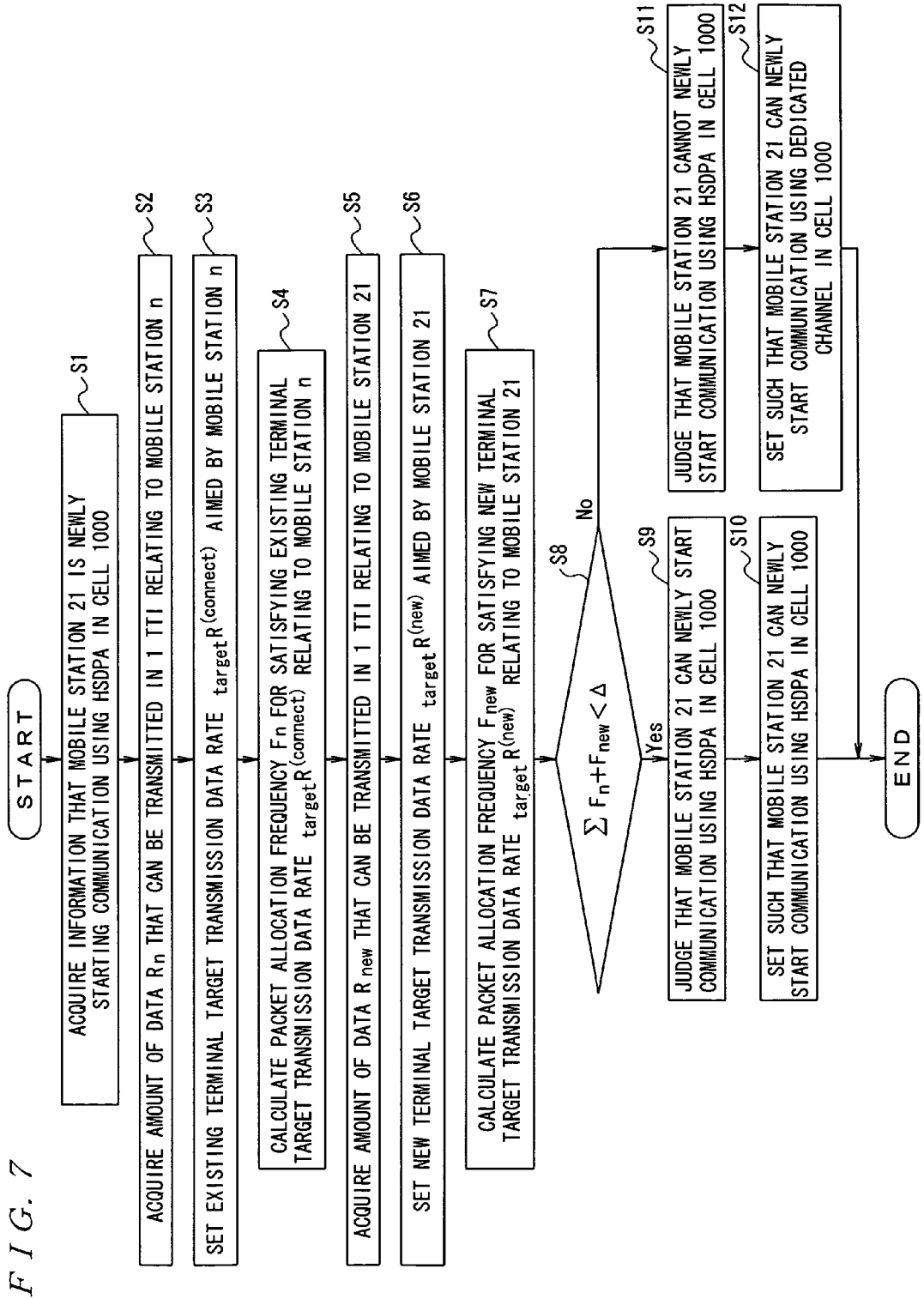

CALL ADMISSION CONTROL DEVICE AND CALL ADMISSION CONTROL METHOD

BACKGROUND OF THE INVENTION

1. Field of the Invention

The present invention relates to a call admission control device and a call admission control method, and more specifically to a call admission control device and a call admission control method for controlling the admission of a call in a packet communication system in mobile communications.

2. Description of the Related Art

A mobile communication system performs a communication using finite resources (frequencies and power), and there is the upper limit to the communication capacity. Therefore, it is necessary to limit the number of mobile stations in a cell depending on the communication capacity. Practically, when a new mobile station starts communications in the cell, it is necessary to judge whether or not the new mobile station can start a communication in the cell. The control is referred to as call admission control. The status in which a new mobile station cannot start a communication in the cell, that is, the status in which the communication capacity is being used substantially 100%, is referred to as a capacity limit.

The conventional call admission control is a control method of, for example, allowing a new mobile station to start communications when the total number of mobile stations being communicating in the cell does not exceed a predetermined threshold value, and not allowing a new mobile station to start communications when the total number of mobile stations being communicating in the cell exceeds the predetermined threshold value.

Relating to the standardization of a third generation mobile communication system, what is called IMT-2000, the standard specifications related to the W-CDMA system and the CDMA 2000 system are prescribed respectively for the 3GPP (third-generation partnership project) and 3GPP2 (third-generation partnership project 2).

In the 3GPP, with the recent fast spread of the Internet, based on the prediction that high speed and large capacitance traffic by the download, etc. from a database and a Web site especially in the downlink, the specification of the "HSDPA (high speed downlink packet access)" as a high speed packet transmission system in the downlink direction is prescribed (for example, refer to 3GPP Tr25.848 v4.0.0).

As for the 3GPP2, from a similar point of view, the specification of the "1x-EVDO" as a high speed dedicated transmission system in the downlink direction is prescribed (for example, refer to 3GPP2 C.S0024 Rev.1.0.0). In the CDMA 2000 1xEV-DO, the DO means "Data Only".

Further described below is the HSDPA.

The HSDPA is a system for performing communications by sharing one or more than two shared channel among a plurality of mobile stations, and a radio base station selects a mobile station which uses the shared channel from among the plurality of mobile stations for each TTI (time transmission interval, 2 ms for the HSDPA) for transmission of a packet. In this case, depending on a way of an occurrence of data traffic, there is a difference in number of mobile stations in a cell when a capacity limit is reached. For example, when the case where all mobile stations download data using an FTP (file transfer protocol) is compared with the case where all mobile stations perform Web browsing, the number of mobile stations in the cell when the capacity limit is reached is larger in the latter case. Because there are packets to be transmitted to the mobile stations all the time exist in downloading data using the FTP, while, in the case of the Web browsing, a user has reading time to browse Web pages and there is time when no packet to be transmitted to a mobile station exists. That is, in the case of the Web browsing, since there is a low frequency at which one mobile station uses a shared channel, more mobile stations can share one shared channel. As a result, in the HSDPA, the number of mobile stations that can be accumulated in a capacity limit fluctuates depending on the way of the occurrence of data traffic.

In the HSDPA, a modulation scheme of a radio channel, a number of codes and a coding rate are adopted depending on the radio channel quality between a mobile station and a radio base station (in the HSDPA, it is called an adaptive modulation and coding scheme), and the transmission data rate fluctuates depending on the radio channel quality (SIR: Signal-to-Interference power Ratio) between the mobile station and the radio base station. On the other hand, the radio channel quality (SIR) largely depends on the mode of a cell such as an outdoor environment and an indoor environment, an urban area and a suburb, etc. That is, in the HSDPA, the number of mobile stations that can be accumulated at the capacity limit fluctuates depending on the mode of a cell.

In the HSDPA, when the call admission control in the above-mentioned conventional method, that is, the call admission control based on the number of mobile stations currently performing communications in a cell, is performed, the number of mobile stations performing communications in the cell in a capacity limit is constant. Therefore, the transmission data rate of each mobile station in a capacity limit depends on the position of each mobile station or the mode in a cell. For example, since there is little interference from other cells in an indoor environment, and the radio channel quality is high, the transmission data rate of each mobile station in a capacity limit is high. However, since there is much interference in an outdoor environment, and the radio channel quality is not high, it is considered that the transmission data rate of each mobile station in a capacity limit is low. However, the transmission data rate of each mobile station in a capacity limit is to be determined by the serviceability of the communications provided using the HSDPA, and it is desired that the speed is independent of the way of the occurrence of data traffic and the form of cells.

JP2002-217956A (hereinafter referred to as patent document 1) describes the technology of controlling the admission of a new call by applying a call admission threshold value to the use status of resources.

As described above, there is a method of not admitting a call by a new mobile station when a total number of mobile stations performing communications in a corresponding cell exceeds a predetermined threshold value as a call admission control method in a communication system which transmits a packet to a plurality of mobile stations.

However, the above-mentioned conventional call admission control method has the disadvantage of not able to appropriately controlling admission of a call depending on the method of generating data traffic and the mode of a cell. That is, when the conventional call admission control method is used, there occurs the problem that the transmission data rate of a mobile station in a capacity limit depends on the method of generating data traffic and the mode of a cell. This problem cannot be solved by the technique according to the above Patent Document 1.

SUMMARY OF THE INVENTION

The present invention has been developed to solve the above-mentioned control techniques, and an objective of the present invention is to provide a call admission control device and a call admission control method capable of realizing call admission control based on a target transmission data rate independent of a method of generating traffic data and a mode of cell by controlling a call admission, in consideration of whether or not a mobile station which has already started communications and a mobile station which is to newly start communications can reach a predetermined target transmission data rate.

The call admission control device according to claim 1 of the present invention is a call admission control device in a communication system for transmitting a packet to a plurality of mobile stations. With the configuration, the admission of a call from a new mobile station is controlled such that a communicating mobile station can satisfy a predetermined target transmission data rate. Thus, call admission control can be appropriately performed based on whether or not a target transmission data rate can be satisfied regardless of the cell mode and the way of the occurrence of traffic.

The call admission control device according to claim 2 of the present invention is a call admission control device in a communication system for transmitting a packet to a plurality of mobile stations. With the configuration, the admission of a call from a new mobile station is controlled such that a communicating mobile station can satisfy a predetermined existing terminal target transmission data rate, and a new mobile station can satisfy a predetermined new terminal target transmission data rate. Thus, call admission control can be appropriately performed based on whether or not a target transmission data rate can be satisfied regardless of the cell mode and the way of the occurrence of traffic on mobile stations which have already started communications and a mobile station which is to newly start communications.

The call admission control device according to claim 3 of the present invention is a call admission control device in a communication system for transmitting a packet to a plurality of mobile stations, and includes:

existing terminal radio channel quality acquisition means (for example, corresponding to the existing terminal radio channel quality acquisition unit 120 shown in FIG. 4) for acquiring a value indicating a radio channel quality of the plurality of mobile stations;

existing terminal target transmission data rate setting means (for example, corresponding to the existing terminal target transmission data rate setting unit 130 shown in FIG. 4) for setting an existing terminal target transmission data rate of the plurality of mobile stations;

existing terminal allocation frequency calculation means (for example, corresponding to the existing terminal allocation frequency calculation unit 140 shown in FIG. 4) for calculating a packet allocation frequency for satisfying the existing terminal target transmission data rate relating to the mobile station based on a value indicating a radio channel quality of the plurality of mobile stations and the existing terminal target transmission data rate;

new terminal radio channel quality acquisition means (for example, corresponding to the new terminal radio channel quality acquisition unit 150 shown in FIG. 4) for acquiring a value indicating a radio channel quality of a new mobile station;

new terminal target transmission data rate setting means (for example, corresponding to the new terminal target transmission data rate setting unit 160 shown in FIG. 4) for setting a new terminal target transmission data rate of the new mobile station;

new terminal allocation frequency calculation means (for example, corresponding to the new terminal allocation frequency calculation unit 170 shown in FIG. 4) for calculating a packet allocation frequency for satisfying the new terminal target transmission data rate relating to the new mobile station based on a value indicating a radio channel quality of the new mobile station and the new terminal target transmission data rate; and new mobile station admission means (for example, corresponding to the new call admission judgment unit 180 shown in FIG. 4) for controlling admission of a call from a new mobile station based on a packet allocation frequency for satisfying the existing terminal target transmission data rate relating to the plurality of mobile stations and a packet allocation frequency for satisfying the new terminal target transmission data rate relating to the new mobile station. Thus, call admission control can be appropriately performed based on whether or not a target transmission data rate can be satisfied regardless of the cell mode and the way of the occurrence of traffic on mobile stations which have already started communications and a mobile station which is to newly start communications.

The call admission control device according to claim 4 of the present invention is a call admission control device in a communication system for transmitting a packet to a plurality of mobile stations n (n is a subscript of mobile stations), and includes:

existing terminal radio channel quality acquisition means (for example, corresponding to the existing terminal radio channel quality acquisition unit 120 shown in FIG. 4) for acquiring a value $R_n$ indicating a radio channel quality of the mobile stations n;

existing terminal target transmission data rate setting means (for example, corresponding to the existing terminal target transmission data rate setting unit 130 shown in FIG. 4) for setting an existing terminal target transmission data rate $_{target}R^{(connect)}$ of the mobile stations n;

existing terminal allocation frequency calculation means (for example, corresponding to the existing terminal allocation frequency calculation unit 140 shown in FIG. 4) for calculating an existing terminal packet allocation frequency Fn of a packet for satisfying the existing terminal target transmission data rate relating to the mobile stations n by $$Fn = {}_{target}R^{(connect)}/R_n;$$

new terminal radio channel quality acquisition means (for example, corresponding to the new terminal radio channel quality acquisition unit 150 shown in FIG. 4) for acquiring a value $R_{new}$ indicating a radio channel quality of a new mobile station;

new terminal target transmission data rate setting means (for example, corresponding to the new terminal target transmission data rate setting unit 160 shown in FIG. 4) for setting a new terminal target transmission data rate $_{target}R^{(new)}$ of the new mobile station;

new terminal allocation frequency calculation means (for example, corresponding to the new terminal allocation frequency calculation unit 170 shown in FIG. 4) for calculating a packet allocation frequency $F_{new}$ for satisfying the new terminal target transmission data rate relating to the new mobile station by $F_{new} = {}_{target}R^{(new)}/R_{new}$; and new mobile station admission means (for example, corresponding to the new call admission judgment unit 180 shown in FIG. 4) for controlling admission of a call from a new mobile station based on $F_n$ and $F_{new}$. Thus, call admission control can be appropriately performed based on whether or not a target transmission data rate can be satisfied regardless of the cell mode and the way of the occurrence of traffic on a mobile station which has already started communications and a mobile station which is to newly start communications.

The call admission control device according to claim 5 is based on claim 4, and the new mobile station admission means accepts the new mobile station when $\Sigma F_n + F_{new}$ ($\Sigma$ is a sum for n, which is common to all other expressions) is lower than a predetermined threshold value, and does not accept the new mobile station when $\Sigma F_n + F_{new}$ is equal to or higher than the predetermined threshold value. By appropriately setting a threshold value, the call admission control can be appropriately performed based on whether or not a target transmission data rate can be satisfied regardless of the cell mode and the way of the occurrence of traffic.

The call admission control device according to claim 6 of the present invention is based on claim 3 or 4, and the value indicating the radio channel quality is a transmission data rate at which it is estimated that a transmission can be performed at a predetermined error rate based on downlink radio quality and downlink power resource and code resource. Thus, appropriate call admission control can be performed.

The call admission control device according to claim 7 of the present invention is based on claim 3 or 4, and the existing terminal target transmission data rate setting means performs one of the process of setting an existing terminal target transmission data rate of the mobile station higher than a new terminal target transmission data rate of the new mobile station and the process of setting an existing terminal target transmission data rate of the mobile station lower than a new terminal target transmission data rate of the new mobile station. Thus, appropriate call admission control can be performed.

The call admission control device according to claim 8 of the present invention is based on claim 3 or 4, and the existing terminal target transmission data rate setting means sets an existing terminal target transmission data rate of the mobile station depending on at least one of each service type, each contract type, each terminal type, each user, each cell, and each Priority Class; and the new terminal target transmission data rate setting means sets a new terminal target transmission data rate of the new mobile station depending on at least one of each service type, each contract type, each terminal type, each user, each cell, and each Priority Class. Thus, appropriate call admission control can be performed.

The call admission control device according to claim 9 of the present invention is based on claim 3, and the existing terminal allocation frequency calculation means calculates a packet allocation frequency for satisfying the existing terminal target transmission data rate relating to the mobile station based on a value $R_n$ indicating a radio channel quality of the plurality of mobile stations, the existing terminal target transmission data rate, and a time rate at which there is data to be transmitted to the plurality of mobile stations. Thus, appropriate call admission control can be performed.

The call admission control method according to claim 10 of the present invention is a method for controlling call admission in a communication system for transmitting a packet to a plurality of mobile stations, and includes:

a step (for example, corresponding to step S2 shown in FIG. 7) of acquiring a value indicating a radio channel quality of the plurality of mobile stations;

a step (for example, corresponding to step S3 shown in FIG. 7) of setting an existing terminal target transmission data rate of the plurality of mobile stations;

a step (for example, corresponding to step S4 shown in FIG. 7) of calculating a packet allocation frequency for satisfying the existing terminal target transmission data rate relating to the mobile station based on a value indicating a radio channel quality of the plurality of mobile stations and the existing terminal target transmission data rate;

a step (for example, corresponding to step S5 shown in FIG. 7) of acquiring a value indicating a radio channel quality of a new mobile station;

a step (for example, corresponding to step S6 shown in FIG. 7) of setting a new terminal target transmission data rate of the new mobile station;

a step (for example, corresponding to step S7 shown in FIG. 7) of calculating a packet allocation frequency for satisfying the new terminal target transmission data rate relating to the new mobile station based on a value indicating a radio channel quality of the new mobile station and the new terminal target transmission data rate; and a step (for example, corresponding to steps S8 to S12 shown in FIG. 7) of controlling admission of a call from a new mobile station based on a packet allocation frequency for satisfying the existing terminal target transmission data rate relating to the plurality of mobile stations and a packet allocation frequency for satisfying the new terminal target transmission data rate relating to the new mobile station. Thus, call admission control can be appropriately performed based on whether or not a target transmission data rate can be satisfied regardless of the cell mode and the way of the occurrence of traffic on a mobile station which has already started communications and a mobile station which is to newly start communications.

As described above, the present invention has the effect of realizing appropriate call admission control regardless of the mode of a corresponding cell and the way of the occurrence of traffic by controlling call admission based on whether or not the target transmission data rate is satisfied.

BRIEF DESCRIPTION OF THE DRAWINGS

FIG. 5 shows an example of a reference table capable of obtaining an amount of data estimated to be transmitted at a predetermined error rate from the number of codes that can be allocated to the HS-PDSCH and the CQI value and held in the HS call admission judgment unit;

FIG. 7 is a flowchart of the call admission control method according to a mode for embodying the present invention.

DETAILED DESCRIPTION OF THE PREFERRED EMBODIMENTS

Figure 1:
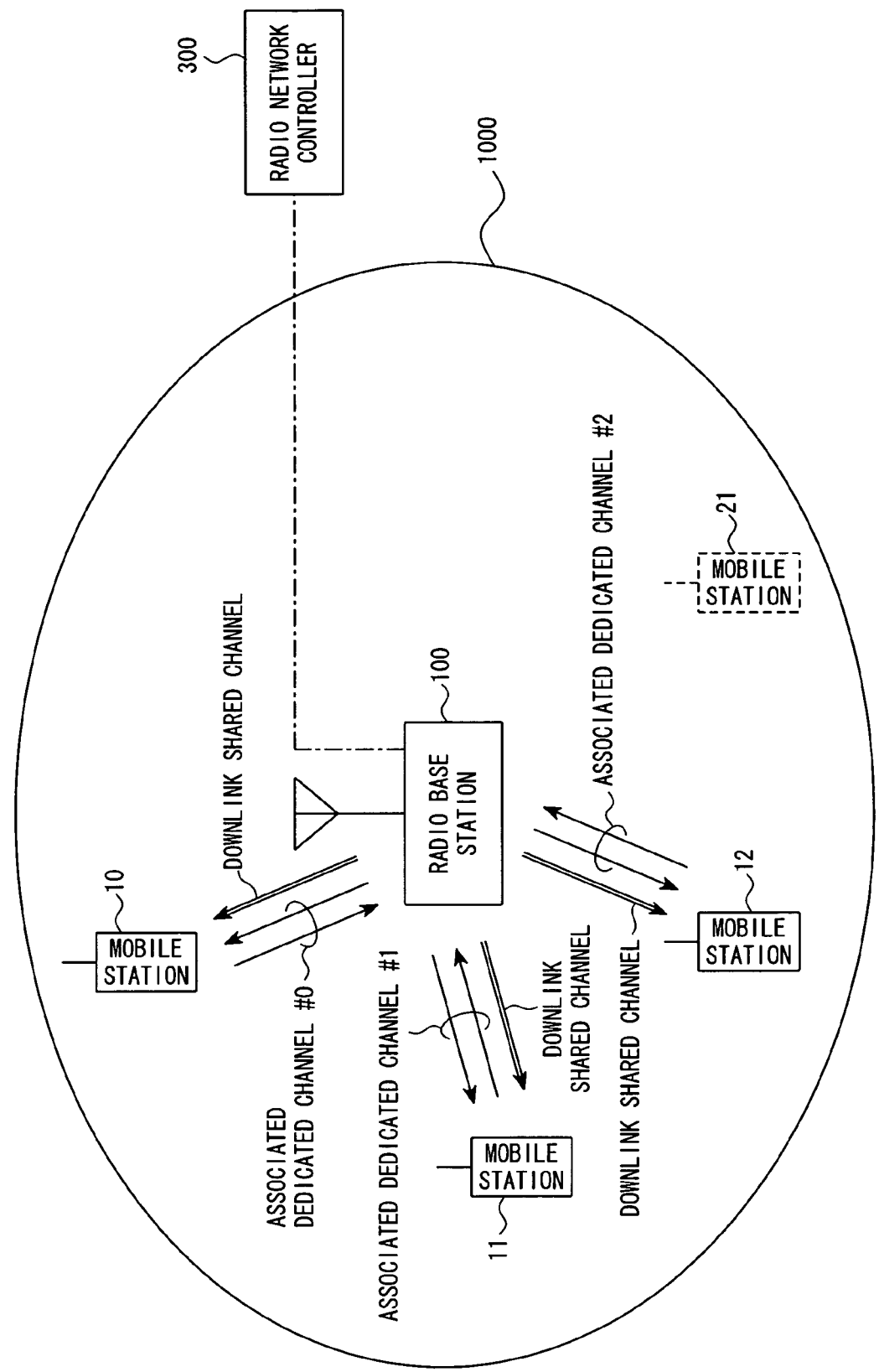
FIG. 1 shows an example of the configuration of the mobile communication system using a call admission control device according to one embodiment of the present invention.

The mode for embodying the present invention is explained below by referring to the attached drawings. In the explanation below, each figure shows a component common with other figures by assigning the same reference numeral.

EMBODIMENTS

Embodiments of the present invention are explained below by referring to the drawings.

FIG. 1 shows an example of the configuration of the mobile communication system using the call admission control device according to one embodiment of the present invention.

In FIG. 1, the mobile communication system is constituted by a plurality of mobile stations 10 to 12 and 21 which are mobile stations, a radio base station 100, and a radio network controller 300 for controlling them, and the above-mentioned HSDPA is applied to the system. The radio base station 100 and radio network controller 300 realize a function as a call admission control device. A cell 1000 is an area in which the radio base station 100 can provide communications.

The mobile stations 10 to 12 are in the state of communicating with the radio base station 100 using the HSDPA in the cell 1000, and the mobile station 21 is in the state in which a new communication with the radio base station 100 using the HSDPA is to be newly started in the cell 1000.

Since the mobile stations 10 to 12 that are performing communications using the HSDPA have the same configuration, function, and status, it is explained as a mobile station n ($n \geq 1$) unless otherwise specified. Additionally, the mobile station 21 is used as an example of a mobile station in a state in which a new communication is to be started using the HSDPA.

A communication channel in the HSDPA is explained below. In the downlink in the HSDPA, a high speed physical downlink shared channel HS-PDSCH shared by each of the mobile stations 10 to 12, a high speed shared control channel HS-SCCH shared by each mobile station, and an associated dedicated physical channel A-DPCH associated with the shared physical channel dedicated to each mobile station are used. In the uplink, in addition to the uplink associated dedicated channel A-DPCH dedicated to each mobile station, a control channel (HS-DPCCH, high speed dedicated physical control channel) for the HSDPA dedicated to each mobile station is used.

In the downlink, along the downlink associated dedicated channel, a transmission power control command, etc. for the uplink associated dedicated channel is transmitted, and user data is transmitted along the shared physical channel. On the other hand, in the uplink, a pilot symbol and a power control command (TPC command) for downlink associated dedicated channel transmission are transmitted in addition to the user data along the uplink associated dedicated channel, and Channel Quality Indicator (CQI) being downlink quality information used for the scheduling of a shared channel and the AMCS (adaptive modulation/coding scheme), and acknowledgement information of downlink shared channel HS-DSCH are transmitted along HS-DPCCH.

(Configuration Example of Radio Base Station)

Figure 2:
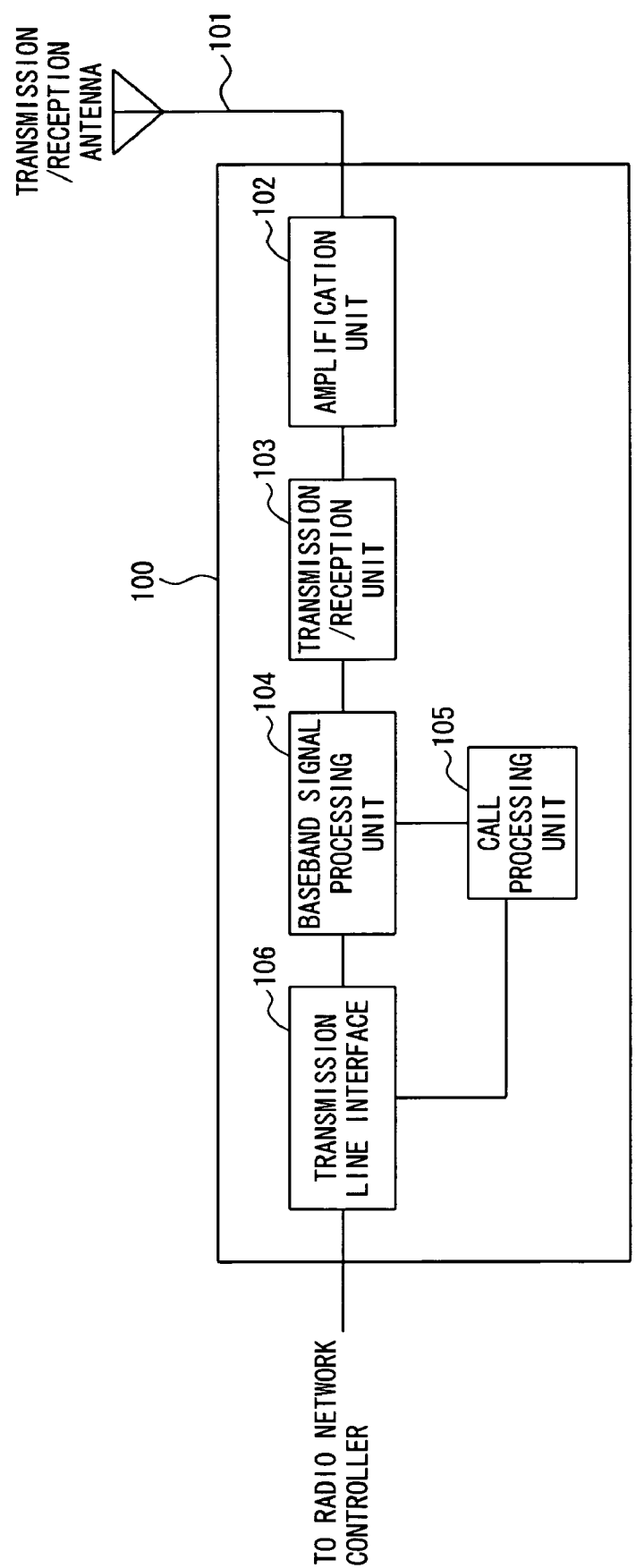
FIG. 2 is a block diagram showing an example of the configuration of the radio base station shown in FIG. 1.

FIG. 2 is a block diagram showing an example of the configuration of the radio base station 100 in FIG. 1.

In FIG. 2, the radio base station 100 is constituted by a transmission/reception antenna 101, an amplification unit 102, a transmission/reception unit 103, a baseband signal processing unit 104, a call processing unit 105, and a transmission line interface 106. The downlink packet data is input from the radio network controller 300 positioned in the upper layer of the radio base station 100 to the baseband signal processing unit 104 through the transmission line interface 106. The baseband signal processing unit 104 performs retransmission control (H-ARQ (Hybrid ARQ)) processing, scheduling, transmission format selection, channel coding, and spreading process for the downlink packet data output from the transmission line interface 106, and the result is transferred to the transmission/reception unit 103. The transmission/reception unit 103 performs a frequency converting process of converting a baseband signal output from the baseband signal processing unit 104 into a radio frequency band. Then, the resultant signal is amplified by the amplification unit 102 and transmitted through the transmission/reception antenna 101.

On the other hand, as for the uplink data, the radio frequency signal received by the transmission/reception antenna 101 is amplified by the amplification unit 102, and the transmission/reception unit 103 frequency-converts it into a baseband signal. The baseband signal is processed by the baseband signal processing unit 104 for de-spreading, RAKE combining, and error correction decoding, and then transferred to the radio network controller through the transmission line interface 106.

The call processing unit 105 communicates a call processing control signal with the radio network controller, manages the status of the radio base station 100, and allocates resources.

Figure 3:
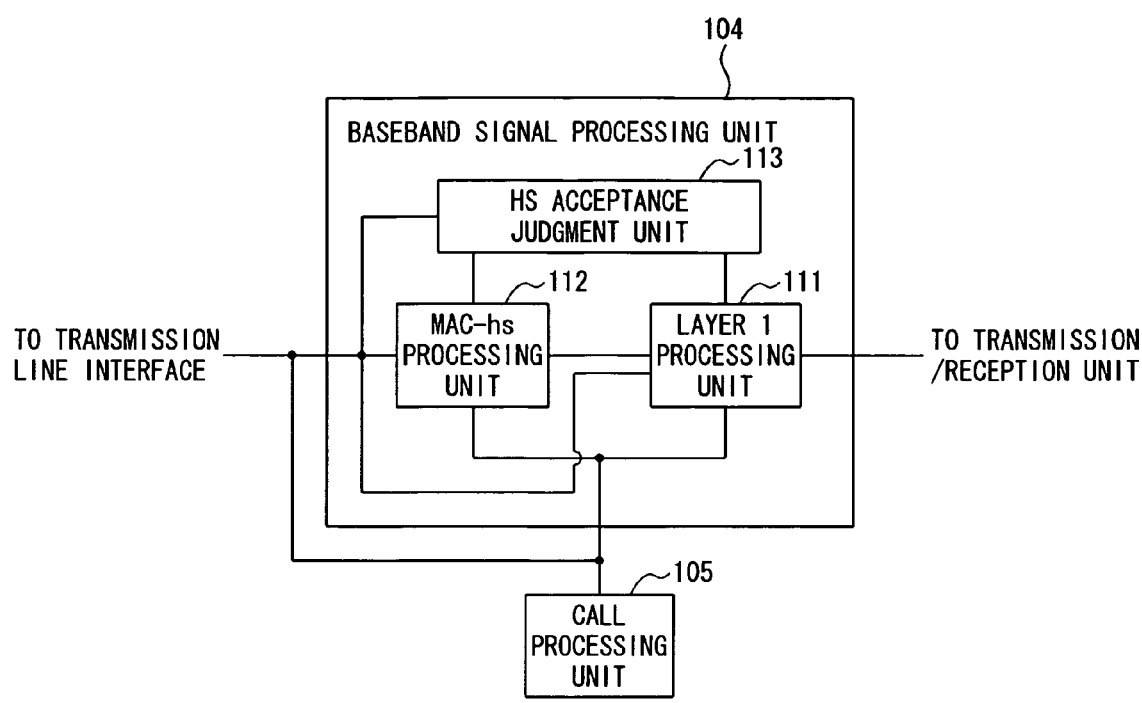
FIG. 3 is a block diagram showing an exemplary configuration of the function of the baseband signal processing unit of the radio base station.

FIG. 3 is a block diagram of the function showing the configuration of the function of the baseband signal processing unit 104.

In FIG. 3, the baseband signal processing unit 104 is constituted by a layer 1 processing unit 111, a MAC-hs (medium access control-HSDPA) processing unit 112, and an HS call admission judge unit 113. Each of the layer 1 processing unit 111 and the MAC-hs processing unit 112 in the baseband signal processing unit 104 is connected to the call processing unit 105. In the layer 1 processing unit 111, the processes of downlink data channel coding, uplink data channel decoding, transmission power control of uplink and downlink dedicated channels, RAKE combining, spreading/de-spreading processing are performed.

The layer 1 processing unit 111 receives the information Channel Quality Indicator (CQI) about the downlink radio channel quality reported along HS-DPCCH from each mobile station, and notifies the information to the MAC-hs processing unit 112 and the HS call admission judge unit 113.

In the MAC-hs processing unit 112, the HARQ (hybrid ARQ) through the downlink shared channel in the HSDPA, the scheduling for a packet to be transmitted, the determination of a transmission format of a downlink shared channel in the AMC, etc. are performed. Also in the MAC-hs processing unit 112, the power Power_available that can be allocated to the HS-PDSCH, and the number of codes Code_available that can be allocated to the HS-PDSCH are calculated, and the result is notified to the HS call admission judgment unit 113.

The HS call admission judgment unit 113 performs call admission judgment on whether or not the mobile station 21 can newly start communications using HSDPA in the cell 1000.

(Example of the Configuration of the Call Admission Judgment Unit)

Figure 4:
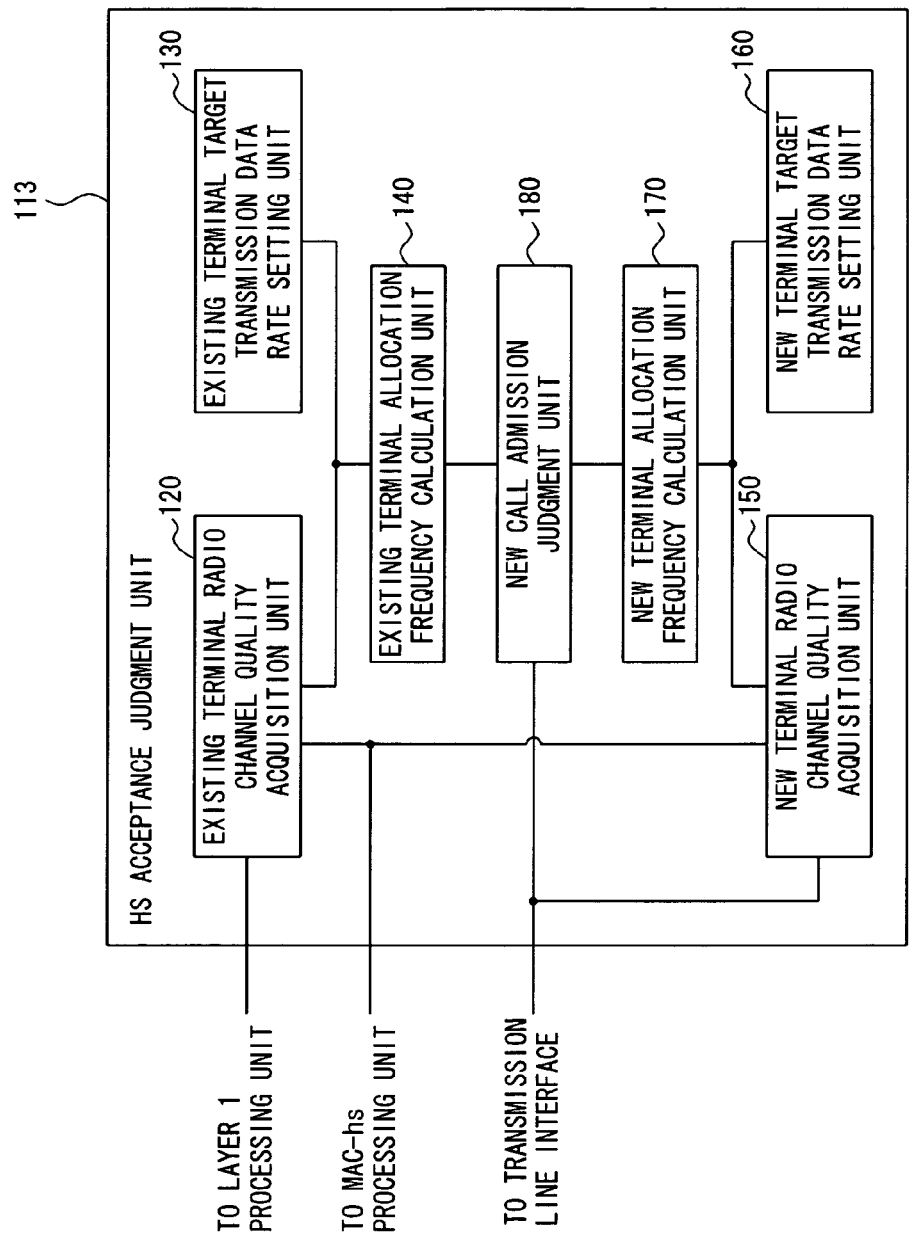
FIG. 4 is a block diagram of an example of the function configuration of the HS call admission judgment unit of the radio base station.

FIG. 4 is a block diagram showing an example of the configuration of the functions of the call admission judgment unit 113 shown in FIG. 3. In FIG. 3, the call admission judgment unit 113 is, for example, constituted by including the following function blocks.

(1) existing terminal radio channel quality acquisition unit 120

(2) existing terminal target transmission data rate setting unit 130

(3) existing terminal allocation frequency calculation unit 140

(4) new terminal radio channel quality acquisition unit 150

(5) new terminal target transmission data rate setting unit 160

(6) new terminal allocation frequency calculation unit 170

(7) new call admission judgment unit 180

The existing terminal radio channel quality acquisition unit 120 of above (1) receives radio quality information $CQI_n$ indicating a downlink radio channel quality reported along a dedicated physical control channel (HS-DPCCH) for an uplink HSDPA from each mobile station n from the layer 1 processing unit 111, and receives the transmission power Power_available that can be allocated to the HS-PDSCH, and the number of codes Code_available that can be allocated to the HS-PDSCH from the MAC-hs processing unit 112. The existing terminal radio channel quality acquisition unit 120 calculates the amount of data $R_n$ that can be transmitted in 1 TTI relating to the mobile station n from the radio quality information $CQI_n$, the transmission power Power_available that can be allocated to the HS-PDSCH, and the number of codes Code_available that can be allocated to the HS-PDSCH, and notifies the existing terminal allocation frequency calculation unit 140 of the amount of data $R_n$ that can be transmitted in 1 TTI relating to the mobile station n. Here, the amount of data $R_n$ that can be transmitted in 1 TTI relating to the mobile station n refers to the amount of data estimated to be transmitted at a predetermined error rate from the radio quality information $CQI_n$, the transmission power Power_available that can be allocated to the HS-PDSCH, and the number of codes Code_available that can be allocated to the HS-PDSCH. For example, when the predetermined error rate is 10%, the error rate obtained when the radio base station transmits a packet having the amount of data of $R_n$ in 1 TTI to the mobile station n is about 10%.

An example of a method of calculating the amount of data $R_n$ that can be transmitted in 1 TTI relating to the mobile station n is shown below.

First, the existing terminal radio channel quality acquisition unit 120 holds a reference table TF_Related_TBS (number of codes that can be allocated to the HS-PDSCH, CQI value) whose amount of data estimated to be transmitted at a predetermined error rate can be obtained from the number of codes that can be allocated to the HS-PDSCH and the CQI value.

(Example of the Configuration of the Reference Table)

FIG. 5 shows a part of the reference table TF_Related_TBS (number of codes that can be allocated to the HS-PDSCH, CQI value). Since the number of codes that can be allocated to the HS-PDSCH is 1 to 15, each table including 15 codes is held.

By the reference table TF_Related_TBS (number of codes that can be allocated to the HS-PDSCH, CQI value) shown in FIG. 5, the value of $R_n$ is obtained from the number of codes that can be allocated to the HS-PDSCH and the CQI value.

There is a maximum number of codes that can be received as one of the capabilities of a mobile station. For example, when the maximum number of codes that can be received is 5, the mobile station cannot receive six or more codes of the HS-PDSCH. Therefore, when the number of codes that can be allocated to the HS-PDSCH is higher than the maximum number of codes that can be received by the mobile station, the number of codes that can be allocated to the HS-PDSCH is replaced with the maximum number of codes that can be received by the mobile station, and the reference table TF_Related_TBS (number of codes that can be allocated to the HS-PDSCH, CQI value) can be referred to. Furthermore, in the example above, the amount of data $R_n$ that can be transmitted in 1 TTI relating to the mobile station n is obtained from the number of codes that can be allocated to the HS-PDSCH and the CQI value. However, it is also possible that the table indicates the relationship among the CQI value, the amount of data that can be transmitted in 1 TTI, the amount of code resources, the modulation system, and the power offset of the power resource.

Next, since the radio quality information CQI is a value calculated by the mobile station n by assuming that the transmission power of the HS-PDSCH is $(P_{CPICH}+\Gamma)$, the existing terminal radio channel quality acquisition unit 120 calculates the value $CQI\_adjust_n$ with the transmission power Power_available that can be allocated to the HS-PDSCH taken into account from the radio quality information $CQI_n$ by the following equation.

$$CQI\_adjust_n = CQI_n + Power\_available - (P_{CPICH}+\Gamma)$$

where $P_{CPICH}$ indicates the transmission power of the CPICH, and $\Gamma$ indicates a power difference value between the CPICH and HS-PDSCH used when the mobile station calculates the CQI, that is, the measurement power offset.

Thus, from the $CQI\_adjust_n$ and the number of codes Code_available that can be allocated to the HS-PDSCH, using the reference table TF_Related_TBS (number of codes that can be allocated to the HS-PDSCH, CQI value), the amount of data $R_n$ that can be transmitted in 1 TTI relating to the mobile station n is calculated.

$$R_n = \text{Table\_TF\_TBS}(\text{Code\_available}, CQI\_adjust_n).$$

In calculating the amount of data $R_n$ that can be transmitted in 1 TTI relating to the mobile station n, the $CQI\_adjust_n$ can be a value obtained by averaging the values of the $CQI\_adjust_n$ for each 1 TTI in a predetermined averaging region. For example, $R_n$ can be calculated using CQI_adjusting obtained by averaging for three seconds the values of $CQI\_adjust_n$ for each 1 TTI. Otherwise, the amount of data $R_n$ that can be transmitted in 1 TTI relating to the mobile station n can be a value obtained by averaging the values of $R_n$ for each TTI in a predetermined averaging region. For example, the value at each TTI can be averaged in three seconds, and the result can be notified to the existing terminal allocation frequency calculation unit 140 as the amount of data $R_n$ that can be transmitted in 1 TTI relating to the mobile station n.

The existing terminal target transmission data rate setting unit 130 of (2) above sets an existing terminal target transmission data rate $_{target}R^{(connect)}$ aimed by the mobile station n which is performing communications in the cell 1000, and notifies the existing terminal allocation frequency calculation unit 140 of the existing terminal target transmission data rate $_{target}R^{(connect)}$.

The existing terminal allocation frequency calculation unit 140 of (3) above receives the amount of data $R_n$ that can be transmitted in 1 TTI relating to the mobile station n from the existing terminal radio channel quality acquisition unit 120, and receives the existing terminal target transmission data rate $_{target}R^{(connect)}$ aimed by the mobile station n from the existing terminal target transmission data rate setting unit 130. Then, from the amount of data $R_n$ that can be transmitted in 1 TTI relating to the mobile station n, and the existing terminal target transmission data rate $_{target}R^{(connect)}$ aimed by the mobile station n, the existing terminal packet allocation frequency Fn for satisfying the existing terminal target transmission data rate $_{target}R^{(connect)}$ aimed by the mobile station n is obtained. Then, the existing terminal packet allocation frequency Fn is notified to the new call admission judgment unit 180.

In this case, for example, the existing terminal packet allocation frequency Fn for satisfying the existing terminal target transmission data rate $_{target}R^{(connect)}$ aimed by the mobile station n is calculated by the following equation from the amount of data $R_n$ that can be transmitted in 1 TTI relating to the mobile station n, and the existing terminal target transmission data rate $_{target}R^{(connect)}$ aimed by the mobile station n.

$$F_n = {_{target}R^{(connect)}}/R_n$$

The calculation of the existing terminal packet allocation frequency Fn has to be performed with the units of $R_n$ and $_{target}R^{(connect)}$ taken into account. It is explained below by referring to a more practical example. Assume that the amount of data $R_n$ that can be transmitted in 1 TTI relating to the mobile station n is 2404 bits and the existing terminal target transmission data rate $_{target}R^{(connect)}$ aimed by the mobile station n is 64 kbps. Since 1 TTI =2 ms in the HSDPA, 128 bits/TTI is calculated to convert the amount of data of 64 kbps into the amount per 1 TTI. Therefore, the existing terminal packet allocation frequency Fn is calculated as follows.

$$F_n = 128/2404 = 0.05324$$

In the example above, the packet allocation frequency is calculated by assuming that there is constantly data in a data queue relating to each mobile station. However, it is considered that there is practically a time when there is no data in a data queue. For example, when mobile station n is performing FTP download, there is constantly data in the data queue in the mobile station n. However, when the i-mode (registered trademark) and the Web browsing are performed, data is generated at random, there is a time period when there is no data in the data queue of the mobile station n. Therefore, instead of calculating a packet allocation frequency by assuming that there is constantly data in the data queue of each mobile station, the packet allocation frequency can be calculated by considering the time rate at which there is data in the data queue. For example, relating to each mobile station, the time rate at which there is data in the data queue is obtained, and the packet allocation frequency can be multiplied by the time rate. In this case, the value of the packet allocation frequency is obtained as follows.

$$F_n = \{_{target}R^{(connect)}/R_n\} \times Prob_n$$

where $Prob_n$ indicates a time rate at which there is data in the data queue relating to the mobile station n. The data queue described above is referred to as a priority queue in the 3GPP specification.

The new terminal radio channel quality acquisition unit 150 of (4) above receives the CPICH Ec/N0 reported by the mobile station 21 from the radio network controller 300 through the transmission line interface 106, and also receives the transmission power Power_available that can be allocated to the HS-PDSCH and the number of codes Code_available that can be allocated to the HS-PDSCH from the MAC-hs processing unit 112. The mobile station 21 is newly starting communications using the HSDPA in the cell 1000 as described above.

The new terminal radio channel quality acquisition unit 150 calculates the amount of data $R_{new}$ that can be transmitted in 1 TTI relating to the mobile station 21 from the CPICH Ec/N0 reported from the mobile station 21, the transmission power Power_available that can be allocated to the HS-PDSCH, and the number of codes Code_available that can be allocated to the HS-PDSCH, and notifies the new terminal allocation frequency calculation unit 170 of the amount of data $R_{new}$ that can be transmitted in 1 TTI relating to the mobile station 21. The amount of data $R_{new}$ that can be transmitted in 1 TTI relating to the mobile station 21 indicates the amount of data estimated to be transmitted at a predetermined error rate from the CPICH Ec/N0 reported by the mobile station 21, the transmission power Power_available that can be allocated to the HS-PDSCH, and the number of codes Code_available that can be allocated to the HS-PDSCH. For example, when the predetermined error rate is 10%, the error rate when a packet whose amount of data in 1 TTI is $R_{new}$ is transmitted by the radio base station to the mobile station 21 is about 10%. An example of the method for calculating the amount of data $R_{new}$ that can be transmitted in 1 TTI relating to the mobile station 21 is shown below.

The new terminal radio channel quality acquisition unit 150 first holds, as with the existing terminal radio channel quality acquisition unit 120, a reference table TF_Related_TBS (number of codes that can be allocated to the HS-PDSCH, CQI value) whose amount of data estimated to be transmitted at a predetermined error rate from the number of codes Code_available that can be allocated to the HS-PDSCH and the CQI value obtainable.

Next, the new terminal radio channel quality acquisition unit 150 calculates the value $CQI\_adjust_{new}$ obtained by considering the transmission power Power_available that can be allocated to the HS-PDSCH by the following equation from the CPICH Ec/N0 reported by the mobile station 21.

$$CQI\_adjust_{new} = CPICH\ Ec/N0 + Power\_available - P_{CPICH} + \gamma$$

where $\gamma$ is a correction coefficient for converting the CPICH Ec/N0 into a CQI value.

From the $CQI\_adjust_{new}$ and the number of codes Code_available that can be allocated to the HS-PDSCH, the amount of data $R_{new}$ that can be transmitted in 1 TTI relating to the mobile station 21 is calculated using the reference table TF_Related_TBS (number of codes that can be allocated to the HS-PDSCH, CQI value).

$$R_{new} = Table\_TF\_TBS(Code\_available, CQI\_adjust_{new})$$

The new terminal target transmission data rate setting unit 160 of (5) above sets the new terminal target transmission data rate $_{target}R^{(new)}$ aimed by the mobile station 21 that is newly starting communications using the HSDPA in the cell 1000, and notifies the new terminal allocation frequency calculation unit 170 of the new terminal target transmission data rate $_{target}R^{(new)}$.

The new terminal allocation frequency calculation unit 170 of (6) above receives the amount of data $R_{new}$ that can be transmitted in 1 TTI relating to the mobile station 21 from the new terminal radio channel quality acquisition unit 150, and also receives the new terminal target transmission data rate $_{target}R^{(new)}$ aimed by the mobile station 21 from the new terminal target transmission data rate setting unit 160. Then, it obtains the new terminal packet allocation frequency $F_{new}$ for satisfying the new terminal target transmission data rate $_{target}R^{(new)}$ aimed by the mobile station 21 from the amount of data $R_{new}$ that can be transmitted in 1 TTI relating to the mobile station 21 and the new terminal target transmission data rate $_{target}R^{(new)}$ aimed by the mobile station 21. Then, it notifies the new call admission judgment unit 180 of the new terminal packet allocation frequency $F_{new}$.

For example, the new terminal packet allocation frequency $F_{new}$ for satisfying the new terminal target transmission data rate $_{target}R^{(new)}$ aimed by the mobile station 21 is calculated by the following equation from the amount of data $R_{new}$ that can be transmitted in 1 TTI relating to the mobile station 21 and the new terminal target transmission data rate $_{target}R^{(new)}$ aimed by the mobile station 21.

$$F_{new} = {_{target}R^{(new)}}/R_{new}$$

where the calculation of the packet allocation frequency $F_{new}$ is to be performed with the units of $R_{new}$ and the $_{target}R^{(new)}$ taken into account. The calculation is explained below by referring to a more practical example. Assume that the amount of data $R_{new}$ that can be transmitted in 1 TTI relating to the mobile station 21 is 7168 bits, and the new terminal target transmission data rate aimed by the mobile station 21 is 128 kbps. In the HSDPA, 1 TTI =2 ms. Therefore, if 128 kbps is converted to the amount of data per 1 TTI, it is obtained as 256 bits/TTI. Therefore, the value of the packet allocation frequency $F_{new}$ is calculated as $F_{new}$ = 256/7168=0.03571.

In the above-mentioned example, the packet allocation frequency is calculated by assuming that there is constantly data in the data queue relating to the mobile station 21. However, it can be considered that there is a time when there is no data in the data queue. For example, when the mobile station 21 performs the FTP download, there is constantly data in the data queue of the mobile station n. However, when the i-mode (registered trademark) and the Web browsing are performed, data is generated at random, there is a time period when there is no data in the data queue of the mobile station n. Therefore, instead of calculating a packet allocation frequency by assuming that there is constantly data in the data queue relating to the mobile station 21, the packet allocation frequency can be calculated by considering the time rate at which there is data in the data queue. However, since the mobile station 21 is to newly start the communications using the HSDPA in the cell 1000, the time rate at which there is data in the data queue cannot be obtained in advance. Therefore, an expected value of the time rate at which there is data in the data queue is considered, and the packet allocation frequency can be calculated. For example, an expected value of the time rate at which there is data in the data queue is obtained relating to the mobile station 21, and the packet allocation frequency can be multiplied by the expected value of the time rate. In this case, the packet allocation frequency is calculated as follows.

$$F_{new} = \{_{target}R^{(new)}/R_{new}\} \times Prob_{expected}$$

where $Prob_{expected}$ is an expected value of the time rate at which there is data in the data queue relating to the mobile station 21 described above. The $Prob_{expected}$ can be determined based on, for example, a service type, a contract type, a terminal type, a cell type, a priority class, etc. Furthermore, the data queue is referred to as a priority queue in the 3GPP specification.

The new call admission judgment unit 180 of (7) receives the existing terminal packet allocation frequency $F_n$ from the existing terminal allocation frequency calculation unit 140, and receives the new terminal packet allocation frequency $F_{new}$ from the new terminal allocation frequency calculation unit 170. Then, it determines based on the existing terminal packet allocation frequency $F_n$ and the new terminal packet allocation frequency $F_{new}$ whether or not the mobile station 21 can newly start the communications using the HSDPA in the cell 1000. The judgment result is transmitted to the radio network controller 300 through the transmission line interface 106.

An example of a method of the new call admission judgment unit 180 judging based on the existing terminal packet allocation frequency $F_n$ and the new terminal packet allocation frequency $F_{new}$ whether or not the mobile station 21 can newly start the communications using the HSDPA in the cell 1000 is described below.

For example, the new call admission judgment unit 180 judges that the mobile station 21 can newly start the communications in the cell 1000 using the HSDPA when $\Sigma F_n + F_{new}$ ($\Sigma$ is a total number relating to n) is lower than a predetermined threshold value $\Delta$, and can judge that the mobile station 21 cannot newly start the communications using the HSDPA in the cell 1000 when $\Sigma F + F_{new}$ is equal to or higher than a predetermined threshold value $\Delta$. In this case, for example, assuming that a packet is allocated to a mobile station in 1 TTI, a sum of the allocation frequency of all mobile stations is 1.0. Therefore, a predetermined threshold value $\Delta$ can be set to 1.0. Otherwise, by assuming that a safer operation is performed, the predetermined threshold value $\Delta$ can be set to a value smaller than 1.0, for example, 0.8. Otherwise, by determining that it can be accepted that there are some mobile stations that cannot satisfy a target transmission data rate, the predetermined threshold value $\Delta$ can be set to a value larger than 1.0, for example, 1.2.

(Example of the Configuration of a Radio Network Controller)

Figure 6:
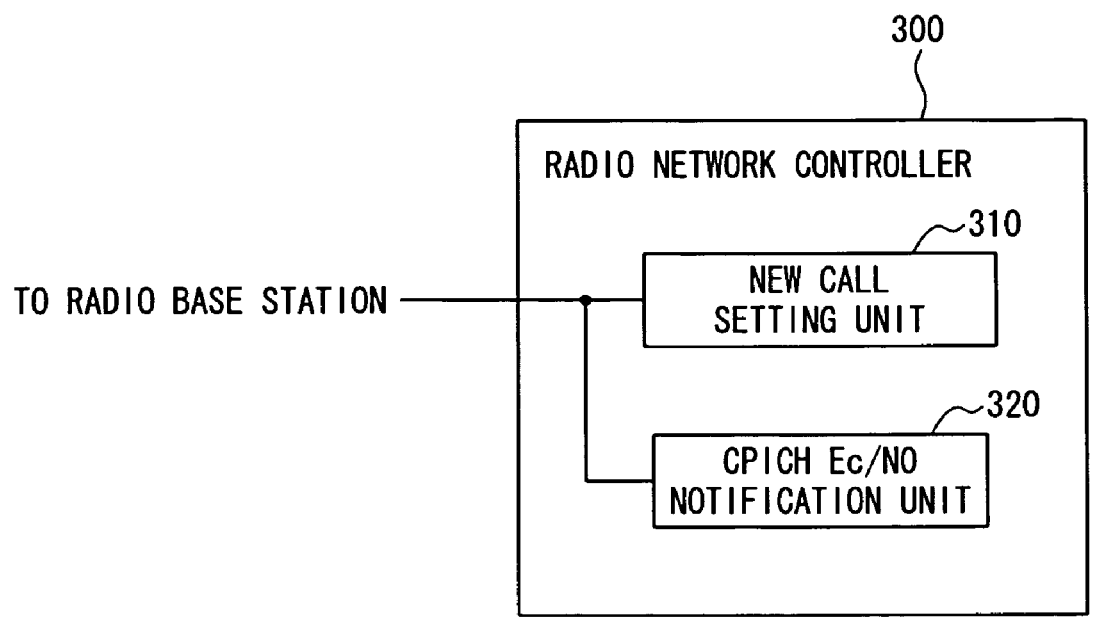
FIG. 6 is a block diagram of an example of the function configuration of the radio network controller shown in FIG. 1.

FIG. 6 is a block diagram showing an example of the configuration of the function of the radio network controller 300. However, in FIG. 6, the function of setting a new call and the function of notifying the radio base station 100 of the CPICH Ec/N0 of the mobile station 21 in the functions of the radio network controller 300 are described, and other functions are omitted. The radio network controller 300 includes a new call setting unit 310 and a CPICH Ec/N0 notification unit 320.

The new call setting unit 310 receives a judgment result as to whether or not the mobile station 21 can newly start communications using the HSDPA in the cell 1000 from the HS call admission judge unit 180 in the radio base station 100. When the judgment result indicates that the mobile station 21 can newly start communications using the HSDPA in the cell 1000, the new call setting unit 310 performs the process for the mobile station 21 starting communications using the HSDPA in the cell 1000. That is, it notifies the radio base station 100 and the mobile station 21 of a control signal for start of the communications, and sets the communications.

On the other hand, when the judgment result indicates that the mobile station 21 cannot newly start communications using the HSDPA in the cell 1000, the new call setting unit 310 does not perform the process for the mobile station 21 starting communications using the HSDPA in the cell 1000. In this case, for example, the new call setting unit 310 can perform the process for starting communications using a dedicated channel instead of the process for starting communications using the HSDPA. In this case, the mobile station 21 performs communications using a dedicated channel in the cell 1000. Otherwise, the new call setting unit 310 can notify the mobile station 21 of the information that the communications using the HSDPA cannot be performed instead of performing the process for starting communications using the HSDPA. In this case, the communications to be started by the mobile station 21 refer to lost calls.

Although the new call admission judge unit 180 in the radio base station 100 judges whether or not the communications using the HSDPA can be started by the mobile station 21, and the new call setting unit 310 in the radio network controller 300 actually perform call admission control as to whether or not the communications using the HSDPA are set, the present invention is not limited to this mode for embodying the present invention. That is, the radio base station 100 can judge whether or not the communications using the HSDPA can be started and set the communications using the HSDPA, and the radio network controller 300 can judge whether or not communications using the HSDPA can be started and set the communications using the HSDPA.

The CPICH Ec/N0 notification unit 320 notifies the new terminal radio channel quality acquisition unit 150 in the radio base station 100 of the value of the CPICH Ec/N0 mapped on the RACH (random access channel) and reported from the mobile station 21. In the present embodiment, the radio network controller 300 receives the CPICH Ec/N0 reported from the mobile station 21, and notifies the radio base station 100 of it, the radio base station 100 can directly receive the CPICH Ec/N0 reported from the mobile station 21.

(Call Admission Control Method)

Next, the call admission control method according to the present invention is explained by referring to the flowchart shown in FIG. 7. The control method is realized by the HS admission judgment unit 113 and the new call setting unit 310, etc.

In FIG. 7, first in step S1, the HS admission judgment unit 113 acquires the information that the mobile station 21 is to newly start communications using the HSDPA in the cell 1000.

In step S2, the existing terminal radio channel quality acquisition unit 120 acquires the amount of data Rn that can be transmitted in 1 TTI relating to the mobile station n.

In step S3, the existing terminal target transmission data rate setting unit 130 sets the existing terminal target transmission data rate $_{target}R^{(connect)}$ aimed by the mobile station n.

In step S4, the existing terminal allocation frequency calculation unit 140 obtains the existing terminal packet allocation frequency Fn for satisfying the existing terminal target transmission data rate $_{target}R^{(connect)}$ aimed by the mobile station n based on the amount of data $R_n$ that can be transmitted in 1 TTI relating to the mobile station n and the existing terminal target transmission data rate $_{target}R^{(connect)}$ aimed by the mobile station n. For example, the existing terminal packet allocation frequency Fn is calculated as follows.

$$F_n = {}_{target}R^{(connect)}/R_n$$

For example, the existing terminal packet allocation frequency Fn is calculated as follows.

$$F_n = \{{}_{target}R^{(connect)}/R_n\} \times \text{Prob}_n$$

where $\text{Prob}_n$ indicates a time rate at which there is data in the data queue relating to the mobile station n.

In step S5, the new terminal radio channel quality acquisition unit 150 acquires the amount of data $R_{new}$ that can be transmitted in 1 TTI relating to the mobile station 21.

In step S6, the new terminal target transmission data rate setting unit 160 sets the new terminal target transmission data rate $_{target}R^{(new)}$ aimed by the mobile station 21.

In step S7, the new terminal allocation frequency calculation unit 170 obtains the new terminal packet allocation frequency $F_{new}$ for satisfying the new terminal target transmission data rate $_{target}R^{(new)}$ aimed by the mobile station 21 based on the amount of data $R_{new}$ that can be transmitted in 1 TTI relating to the mobile station 21 and the new terminal target transmission data rate $_{target}R^{(new)}$ aimed by the mobile station 21. For example, the new terminal packet allocation frequency $F_{new}$ is calculated as follows.

$$F_{new} = {}_{target}R^{(new)}/R_{new}$$

Furthermore, for example, the new terminal packet allocation frequency $F_{new}$ is calculated as follows.

$$F_{new} = \{{}_{target}R^{(new)}/R_{new}\} \times \text{Prob}_{expected}$$

where the $\text{Prob}_{expected}$ is an expected value of the time rate at which there is data in the data queue relating to the mobile station 21.

In step S8, the new call admission judgment unit 180 judges whether or not $\Sigma F_n + F_{new}$ ($\Sigma$ is a total number of n) is lower than a predetermined threshold value $\Delta$. If it judges that $\Sigma F_n + F_{new}$ ($\Sigma$ is a total number of n) is lower than the predetermined threshold value $\Delta$, control is passed to step S9. If it judges that $\Sigma F_n + F_{new}$ ($\Sigma$ is a total number of n) is not lower than the predetermined threshold value $\Delta$, control is passed to step S11.

In step S9, the new call admission judge unit 180 judges that the mobile station 21 can newly start the communications using the HSDPA in the cell 1000.

In step S10, the new call setting unit 310 performs setting communications so that the mobile station 21 can newly start communications using the HSDPA in the cell 1000.

In step S11, the new call admission judge unit 180 judges that the mobile station 21 cannot newly start communications using the HSDPA in the cell 1000.

In step S12, the new call setting unit 310 performs setting so that the mobile station 21 can newly start communications using a dedicated channel in the cell 1000. The new call setting unit 310 is being able to judge that the mobile station 21 cannot newly start communications in the cell 1000 instead of performing settings so that the mobile station 21 can newly start communications using a dedicated channel in the cell 1000, and perform the process of not performing settings of any communications. In this case, the communications to be performed by the mobile station 21 refer to lost calls.

In the description above, the processes in steps S2 to S4 are performed when the communications are newly started using the HSDPA in the cell 1000 by the mobile station 21. However, the processes in steps S2 to S4 can be performed at predetermined time intervals. For example, the processes in steps S2 to S4 can be performed every third second by setting 3 seconds as a judgment period. In this case, the processes in S2 to S4 are performed in the background, and the result of the processes in steps S2 to S4 is referred to when the processes in steps S5 to S12 are performed.

In step S8, the operational effect of judging whether or not $\Sigma F_n + F_{new}$ ($\Sigma$ is a total number of n) is lower than the predetermined threshold value $\Delta$ is described. For example, assume that the predetermined threshold value $\Delta$ is set to 1.0.

Assuming that a packet is allocated to a mobile station in 1 TTI, and $\Sigma F_n + F_{new}$ ($\Sigma$ is a total number of n) is lower than 1.0, it can be considered that both the mobile station already communicating in the cell 1000 and the mobile station to newly start communications in the cell 1000 can satisfy the target transmission data rate. On the other hand, if $\Sigma F_n + F_{new}$ ($\Sigma$ is a total number of n) is 1.0 or higher, and when the mobile station 21 has newly started the communications using the HSDPA in the cell 1000, at least one of the mobile stations already communicating in the cell 1000, or the mobile station newly starting the communications in the cell 1000 cannot satisfy the target transmission data rate. Therefore, based on the judgment result as to whether or not $\Sigma F_n + F_{new}$ ($\Sigma$ is a total number of n) is lower than a predetermined threshold value $\Delta$, it is determined whether or not the mobile station 21 can newly start the communication using the HSDPA in the cell 1000, the call admission control can be performed based on whether or not a target transmission data rate can be satisfied.

The above-mentioned reference table TF_Related_TBS (number of codes that can be allocated to the HS-PDSCH, CQI value), the existing terminal target transmission data rate $_{target}R^{(connect)}$ aimed by the mobile station n, the new terminal target transmission data rate $_{target}R^{(new)}$ aimed by the mobile station 21, and a predetermined threshold value Δ can be set depending on the specification from a remote apparatus, for example, an upper node of the radio base station 100 (for example, a radio network controller, a server of a core network) via the transmission line interface 106. Otherwise, the reference table TF_Related_TBS (number of codes that can be allocated to the HS-PDSCH, CQI value), the existing terminal target transmission data rate $_{target}R^{(connect)}$ aimed by the mobile station n, the new terminal target transmission data rate $_{target}R^{(new)}$ aimed by the mobile station 21, and a predetermined threshold value Δ are held as the station data of the radio base station 100, and can be set by referring to the values of the station data.

The existing terminal target transmission data rate $_{target}R^{(connect)}$ aimed by the mobile station n and the new terminal target transmission data rate $_{target}R^{(new)}$ aimed by the mobile station 21 can be designed to be set for each service type, contract type, terminal type, cell type, or priority class. For example, the service type indicates the type of service transmitted in the downlink packet, and includes, for example, a VoIP service, a voice service, a streaming service, an FTP service, etc. The contract type indicates the type of contract made by a user of a destination mobile station of the downlink packet, and can be, for example, a low class contract, a high class contract, etc. The terminal type classifies the performance of a mobile station as a destination of a downlink packet, and includes a class according to the identification information about a mobile station, the presence/absence or type of the RAKE reception function, equalizer, reception diversity, an interference canceller, etc., a receivable modulation scheme, the terminal capability such as the number of codes, the number of bits, etc. For example, in the 3GPP specification, an HS-DSCH category is defined as a category class of an HSDPA mobile station (refer to TS25.306 v5.12.0). The cell type indicates the type of mode of a cell in which mobile stations as destinations of downlink packets are resident. For example, it includes a class according to the cell identification information, indoor or outdoor suburbs or urban, high traffic region or a low traffic region, etc. Furthermore, the priority class refers to the priority relating to transmission of a downlink packet. For example, a downlink packet of a priority class having the first priority is transmitted on a priority basis over a downlink packet of the priority class having the second priority.

The existing terminal target transmission data rate $_{target}R^{(connect)}$ aimed by the mobile station n can be set to a value of 0 kbps or higher. For example, 64 kbps is set. The new terminal target transmission data rate $_{target}R^{(new)}$ aimed by the mobile station 21 can be set to a value of 0 kbps. In this case, it is not considered whether or not the transmission data rate aimed by the mobile station 21 is satisfied.

The new terminal target transmission data rate $_{target}R^{(new)}$ aimed by the mobile station 21 can be set higher than the existing terminal target transmission data rate $_{target}R^{(connect)}$ aimed by the mobile station n. In this case, it becomes difficult to accept the mobile station 21 which is to newly start the communications using the HSDPA in the cell 1000, thereby prioritizing the mobile station n already performing the communications using the HSDPA in the cell 1000. On the other hand, the new terminal target transmission data rate $_{target}R^{(new)}$ aimed by the mobile station 21 can be set lower than the existing terminal target transmission data rate $_{target}R^{(connect)}$ aimed by the mobile station n. In this case, it is possible to more easily accept the mobile station 21 which is newly starting communications in the cell 1000 using the HSDPA.

In the embodiment of the present invention described above, call admission control can be performed depending on whether or not a target transmission data rate can be satisfied.

The HS admission judgment unit 113 is constituted by, for example, a CPU, a digital signal processor (DSP), or a programmable device capable of rewriting a program such as an FPGA (field programmable gate array), etc. In a predetermined memory area, the above-mentioned program is stored, and parameters (TF_Related_TBS (number of codes that can be allocated to the HS-PDSCH, CQI value), $_{target}R^{(connect)}$, $_{target}R^{(new)}$, Δ) are downloaded and rewritten. At this time, the parameter (TF_Related_TBS (number of codes that can be allocated to the HS-PDSCH, CQI value), $_{target}R^{(connect)}$, $_{target}R^{(new)}$, Δ) can be downloaded from the upper node of the radio base station, or a terminal I/F (external interface function) is provided for the HS admission judgment unit 113 so that the parameters (TF_Related_TBS (number of codes that can be allocated to the HS-PDSCH, CQI value), $_{target}R^{(connect)}$, $_{target}R^{(new)}$, Δ) can be directly read from the terminal.

The function blocks of the HS admission judgment unit 113 can be divided by hardware, or divided as software by the program on a processor.

The embodiment is described relating to the high speed packet transmission system HSDPA in the 3GPP. However, the present invention is not limited to the HSDPA, but can also be applied to a high speed packet transmission system in other mobile communication systems. For example, the high speed packet transmission system provided by the long term evolution in the 3GPP, the high speed packet transmission system in the cdma 2000 1xEV-DO in 3GPP2 and TDD (Time Division Duplex), etc. can be other high speed packet transmission systems. In the example above, it is applied to the packet transmission system of the downlink, but it also can be applied to a packet transmission system of the uplink.

The present invention can be applied to the call admission control in a packet communications system in the mobile communications.

What is claimed is:

1. A call admission control device in a communication system for transmitting a packet to a plurality of mobile stations, the call admission control device comprising:

an existing terminal radio channel quality acquisition unit that acquires: a value indicating a downlink radio channel quality, which is Channel Quality Indicator (CQI) indicating radio quality information, of each of a plurality of mobile stations which have already started communication; a transmission power allocatable to a downlink shared channel; and a number of codes allocatable to the plurality of mobile stations which have already started communication, and then notifies an amount of data transmittable by said each of the plurality of mobile stations which have already started communication in 1 TTI (Time Transmission Interval);

an existing terminal target transmission data rate setting unit that sets an existing terminal target transmission data rate of said each of the plurality of mobile stations which have already started communication; and an existing terminal allocation frequency calculation unit that calculates a packet allocation frequency for satisfying the existing terminal target transmission data rate relating to said each of the plurality of mobile stations which have already started communication based on the amount of data transmittable in 1TTI by said each of the plurality of mobile stations which have already started communication and the existing terminal target transmission data rate;

wherein an admission of a call from a new mobile station which desires to start communication is controlled such that said each of the plurality of mobile stations which have already started communication can satisfy the existing terminal target transmission data rate.

2. The call admission control device according to claim 1, wherein the admission of the call from the new mobile station is controlled such that said each of the plurality of mobile stations which have already started communication can satisfy the existing terminal target transmission data rate, and the new mobile station can satisfy a predetermined new terminal target transmission data rate.

3. The call admission control device according to claim 2, further comprising:

a new terminal radio channel quality acquisition unit that acquires: a value indicating a downlink radio channel quality of the new mobile station, which is CPICH Ec/N0 (Common Pilot Channel, the received Energy per chip divided by the power density in the band) indicating radio quality information of the new mobile station; a transmission power allocatable to a downlink shared channel; and a number of codes allocatable to the new mobile station, and then notifies an amount of data transmittable by the new mobile station in 1 TTI;

a new terminal target transmission data rate setting unit that sets a new terminal target transmission data rate of the new mobile station;

a new terminal allocation frequency calculation unit that calculates a packet allocation frequency for satisfying the new terminal target transmission data rate relating to the new mobile station based on the value indicating the radio channel quality of the new mobile station and the new terminal target transmission data rate; and a new call admission judgment unit that controls admission of the call from the new mobile station based on the packet allocation frequency for satisfying the existing terminal target transmission data rate relating to the plurality of mobile stations and the packet allocation frequency for satisfying the new terminal target transmission data rate relating to the new mobile station.

4. A call admission control device in a communication system for transmitting a packet to a plurality of mobile stations n, where n is a subscript of mobile stations, the call admission control device comprising:

an existing terminal radio channel quality acquisition unit that acquires a value $R_n$ indicating a downlink radio channel quality, which is Channel Quality Indicator (CQI) indicating radio quality information, of each of the mobile stations n which have already started communication; a transmission power allocatable to a downlink shared channel; and a number of codes t allocatable to the plurality of mobile stations which have already started communication, and then notifies an amount of data transmittable by said each of the plurality of mobile stations which have already started communication in 1 TTI (Time Transmission Interval);

an existing terminal target transmission data rate setting unit that sets an existing terminal target transmission data rate $_{target}R^{(connect)}$ of said each of the mobile stations n which have already started communication;

an existing terminal allocation frequency calculation unit that calculates an existing terminal packet allocation frequency Fn of a packet for satisfying the existing terminal target transmission data rate relating to the mobile stations n by $Fn = {_{target}R^{(connect)}}R_n$;

a new terminal radio channel quality acquisition unit that acquires: a value $R_{new}$ indicating a downlink radio channel quality of a new mobile station which desires to start communication, the downlink radio channel quality being CPICH Ec/N0 (Common Pilot Channel, the received Energy per chip divided by the power density in the band) indicating radio quality information of the new mobile station; a transmission power allocatable to a downlink shared channel; and a number of codes allocatable to the new mobile station, and then notifies an amount of data transmittable by the new mobile station in 1 TTI;

a new terminal target transmission data rate setting unit that sets a new terminal target transmission data rate $_{target}R^{(new)}$ of the new mobile station;

a new terminal allocation frequency calculation unit that calculates a packet allocation frequency $F_{new}$ for satisfying the new terminal target transmission data rate relating to the new mobile station by $F_{new} = {_{target}R^{(new)}}/R_{new}$; and a new call admission judgment unit that controls an admission of a call from the new mobile station based on $F_n$ and $F_{new}$.

5. The call admission control device according to claim 4, wherein the new mobile station admission unit accepts the new mobile station when $\Sigma F_n + F_{new}$, where $\Sigma$ is a total number for n, which is common to all other expressions, is lower than a predetermined threshold value, and does not accept the new mobile station when $\Sigma F_n + F_{new}$ is equal to or higher than the predetermined threshold value.

6. The call admission control device according to claim 3, wherein the existing terminal target transmission data rate setting unit performs one of a process of setting the existing terminal target transmission data rate of the mobile station to be higher than the new terminal target transmission data rate of the new mobile station, and a process of setting the existing terminal target transmission data rate of the mobile station to be lower than the new terminal target transmission data rate of the new mobile station.

7. The call admission control device according to claim 3, wherein:

the existing terminal target transmission data rate setting unit sets the existing terminal target transmission data rate of the mobile station depending on at least one of each service type, each contract type, each terminal type, each user, each cell, and each Priority Class; and the new terminal target transmission data rate setting unit sets the new terminal target transmission data rate of the new mobile station depending on at least one of each service type, each contract type, each terminal type, each user, each cell, and each Priority Class.

8. The call admission control device according to claim 3, wherein the existing terminal allocation frequency calculation unit calculates the packet allocation frequency for satisfying the existing terminal target transmission data rate relating to the mobile station based on a value $R_n$ indicating the downlink radio channel quality of each of the plurality of mobile stations, the existing terminal target transmission data rate, and a time rate at which there is data to be transmitted to the plurality of mobile stations.

9. A method for controlling call admission in a communication system for transmitting a packet to a plurality of mobile stations, the method comprising:

acquiring a value indicating a downlink radio channel quality, which is Channel Quality Indicator (CQI) indicating a radio quality information, of each of the plurality of mobile stations which have already started communication; a transmission power allocatable to a downlink shared channel; and a number of codes allocatable to the plurality of mobile stations which have already started communication;

notifying an amount of data transmittable by said each of the plurality of mobile stations which have already started communication in 1 TTI (Time Transmission Interval);

setting an existing terminal target transmission data rate of said each of the plurality of mobile stations which have already started communication;

calculating a packet allocation frequency for satisfying the existing terminal target transmission data rate relating to said each of the plurality of mobile stations which have already started communication based on the amount of data transmittable in 1 TTI by said each of the plurality of mobile stations which have already started communication and the existing terminal target transmission data rate;

acquiring: a value indicating a downlink radio channel quality of a new mobile station which desires to start communication, which is CPICH Ec/N0 (Common Pilot Channel, the received Energy per chip divided by the power density in the band) indicating radio Quality information of the new mobile station; a transmission power allocatable to a downlink shared channel; and a number of codes allocatable to the new mobile station;

notifying an amount of data transmittable by the new mobile station in 1 TTI;

setting a new terminal target transmission data rate of the new mobile station;

calculating a packet allocation frequency for satisfying the new terminal target transmission data rate relating to the new mobile station based on the value indicating the radio channel quality of the new mobile station and the new terminal target transmission data rate; and controlling an admission of a call from the new mobile station based on the packet allocation frequency for satisfying the existing terminal target transmission data rate relating to each of the plurality of mobile stations and the packet allocation frequency for satisfying the new terminal target transmission data rate relating to the new mobile station, so that said each of the plurality of mobile stations which have already started communication can satisfy the existing terminal target transmission data rate.

* * * * *